United States Patent
Takei

(10) Patent No.: US 10,762,333 B2
(45) Date of Patent: Sep. 1, 2020

(54) MAKEUP TREND ANALYZING APPARATUS, MAKEUP TREND ANALYZING METHOD, AND NON-TRANSITORY COMPUTER-READABLE RECORDING MEDIUM STORING MAKEUP TREND ANALYZING PROGRAM

(71) Applicant: Panasonic Intellectual Property Management Co., Ltd., Osaka (JP)

(72) Inventor: Ichiro Takei, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 15/995,167

(22) Filed: Jun. 1, 2018

(65) Prior Publication Data

US 2018/0276453 A1 Sep. 27, 2018

Related U.S. Application Data

(63) Continuation of application No. PCT/JP2016/004943, filed on Nov. 22, 2016.

(30) Foreign Application Priority Data

Jan. 22, 2016 (JP) ................................. 2016-010754

(51) Int. Cl.
G06K 9/00 (2006.01)
G06T 1/00 (2006.01)
(Continued)

(52) U.S. Cl.
CPC ......... *G06K 9/00281* (2013.01); *A45D 44/00* (2013.01); *A45D 44/005* (2013.01);
(Continued)

(58) Field of Classification Search
None
See application file for complete search history.

(56) References Cited

U.S. PATENT DOCUMENTS

2006/0178904 A1* 8/2006 Aghassian ........... A45D 44/005
705/1.1
2014/0226896 A1* 8/2014 Imai ....................... G06Q 50/10
382/154
(Continued)

FOREIGN PATENT DOCUMENTS

JP 2001-346627 12/2001
JP 2007-175384 7/2007
(Continued)

OTHER PUBLICATIONS

International Search Report of PCT application No. PCT/JP2016/004943 dated Jan. 24, 2017.

*Primary Examiner* — Delomia L Gilliard
(74) *Attorney, Agent, or Firm* — Greenblum & Bernstein, P.L.C.

(57) ABSTRACT

There are included a facial feature point acquiring unit that acquires a facial feature point within a makeup facial image that is an image of a face on which makeup is applied, a makeup feature point acquiring unit that acquires a makeup feature point within the makeup facial image, a makeup information generator that generates, based on the facial feature point and the makeup feature point, makeup information quantitatively indicating positional information of the makeup feature point in a face coordinate system that takes the facial feature point as a reference, a trend analyzer that analyzes the makeup information acquired from a plurality of the makeup facial images, and determines a makeup trend, and an analysis result output unit that per- (Continued)

forms an information output process according to a determination result of the makeup trend.

9 Claims, 11 Drawing Sheets

(51) Int. Cl.
 *G06Q 50/10* (2012.01)
 *A45D 44/00* (2006.01)
(52) U.S. Cl.
 CPC ......... *G06K 9/00248* (2013.01); *G06Q 50/10* (2013.01); *G06T 1/00* (2013.01); *A45D 2044/007* (2013.01)

(56) References Cited

U.S. PATENT DOCUMENTS

| | | | |
|---|---|---|---|
| 2015/0086945 A1* | 3/2015 | Yamanashi | A45D 44/005 |
| | | | 434/100 |
| 2015/0254501 A1* | 9/2015 | Yamanashi | G06K 9/00268 |
| | | | 348/78 |
| 2016/0143420 A1 | 5/2016 | Yamanashi et al. | |
| 2016/0143421 A1 | 5/2016 | Yamanashi et al. | |
| 2019/0122404 A1* | 4/2019 | Freeman | G06K 9/4652 |
| 2019/0362134 A1* | 11/2019 | Kim | G06K 9/4652 |

FOREIGN PATENT DOCUMENTS

| | | |
|---|---|---|
| JP | 2014-147561 | 8/2014 |
| WO | 2015/029372 | 3/2015 |

\* cited by examiner

FIG. 3

| FACIAL FEATURE POINT ID | FACIAL FEATURE POINT NAME | INFORMATION FOR FACIAL FEATURE POINT EXTRACTION |
|---|---|---|
| FF1 | INNER CORNER OF EYE | FE1 |
| FF2 | OUTER CORNER OF EYE | FE2 |
| FF3 | HIGHEST POINT OF UPPER LID | FE3 |
| FF4 | HIGHEST POINT OF LOWER EDGE OF EYEBROW | FE4 |
| FF5 | HIGHEST POINT OF UPPER EDGE OF EYEBROW | FE5 |
| FF6 | INNER END OF EYEBROW | FE6 |
| FF7 | OUTER END OF EYEBROW | FE7 |
| ⋮ | ⋮ | ⋮ |

FIG. 4

| MAKEUP PART ID | MAKEUP PART NAME | MAKEUP FEATURE POINT ID | MAKEUP FEATURE POINT NAME | INFORMATION FOR MAKEUP FEATURE POINT EXTRACTION |
|---|---|---|---|---|
| MI1 | EYESHADOW | MF11 | INNER END PORTION | ME11 |
| | | MF12 | OUTER END PORTION | ME12 |
| | | MF13 | HIGHEST POINT OF UPPER EDGE | ME13 |
| MI2 | EYEBROW | MF21 | INNER END PORTION | ME21 |
| | | MF22 | OUTER END PORTION | ME22 |
| | | MF23 | HIGHEST POINT OF UPPER EDGE | ME23 |
| | | MF24 | HIGHEST POINT OF LOWER EDGE | ME24 |
| ⋮ | ⋮ | ⋮ | ⋮ | ⋮ |

FIG. 6

| MAKEUP PART ID | MAKEUP PART NAME | ANALYSIS TARGET ID | ANALYSIS TARGET NAME | ANALYSIS TARGET DEFINITION |
|---|---|---|---|---|
| MI1 | EYESHADOW | AI11 | EYESHADOW INNER SIDE | VECTOR FF1→MF11 |
| | | AI12 | EYESHADOW OUTER SIDE | VECTOR FF2→MF12 |
| | | AI13 | EYESHADOW UPPER-SIDE SHAPE | VECTOR FF3→MF13 |
| | | AI14 | EYESHADOW COLOR | AVERAGE COLOR AND DENSITY OF REGION SURROUNDED BY MF11 TO MF13, FF3 |
| MI2 | EYEBROW | AI21 | EYEBROW INNER SIDE | VECTOR FF1→MF11 |
| | | AI22 | EYEBROW OUTER SIDE | VECTOR FF2→MF12 |
| | | AI23 | EYEBROW THICKNESS | RATIO OF LENGTH OF MF23→MF24 TO LENGTH OF FF1→FF2 |
| | | AI24 | EYEBROW COLOR | AVERAGE COLOR AND DENSITY OF REGION SURROUNDED BY MF21 TO MF24 |
| ⋮ | ⋮ | ⋮ | ⋮ | ⋮ |

FIG. 9

| 611 | 612 | 613 | 614 | 615 | 616 | 617 |
|---|---|---|---|---|---|---|
| SAMPLE ID | ATTRIBUTE INFORMATION (AGE, DISTRICT, FACIAL FEATURE, ETC.) | TIME INFORMATION | MAKEUP PART ID | MAKEUP PART NAME | ANALYSIS TARGET ID | VALUE |
| S1 | U1 | T1 | MI1 | EYESHADOW | AI11 | V1 |
| | | | | | AI12 | V2 |
| | | | | | AI13 | V3 |
| | | | | | AI14 | V4 |
| | | | MI2 | EYEBROW | AI21 | V5 |
| | | | | | AI22 | V6 |
| | | | | | AI23 | V7 |
| | | | | | AI24 | V8 |
| S2 | U2 | T2 | MI1 | EYESHADOW | AI11 | V9 |
| | | | ⋮ | ⋮ | ⋮ | ⋮ |
| ⋮ | ⋮ | ⋮ | ⋮ | ⋮ | ⋮ | ⋮ |

| ATTRIBUTE GROUP | MAKEUP PART ID | MAKEUP PART NAME | ANALYSIS TARGET ID | AVERAGE VALUE | PREDICTED AVERAGE VALUE AFTER ONE MONTH |
|---|---|---|---|---|---|
| G1 | MI1 | EYESHADOW | AI11 | AV1 | PV1 |
| | | | AI12 | AV2 | PV2 |
| | | | AI13 | AV3 | PV3 |
| | | | AI14 | AV4 | PV4 |
| | MI2 | EYEBROW | AI21 | AV5 | PV5 |
| | | | AI22 | AV6 | PV6 |
| | | | AI23 | AV7 | PV7 |
| | | | AI24 | AV8 | PV8 |
| G1 | MI1 | EYESHADOW | AI11 | AV9 | PV9 |
| | ⋮ | ⋮ | ⋮ | ⋮ | ⋮ |
| ⋮ | ⋮ | ⋮ | ⋮ | ⋮ | ⋮ |

MAKEUP TREND ANALYZING APPARATUS, MAKEUP TREND ANALYZING METHOD, AND NON-TRANSITORY COMPUTER-READABLE RECORDING MEDIUM STORING MAKEUP TREND ANALYZING PROGRAM

BACKGROUND

1. Technical Field

The present disclosure relates to a makeup trend analyzing apparatus, a makeup trend analyzing method, and a non-transitory computer-readable recording medium storing a makeup trend analyzing program that analyze makeup trends.

2. Description of the Related Art

Makeup artists and the like generally analyze tendency of trend of makeup (hereinafter referred to as "makeup trend") such as which makeup (cosmetic applied on face; hereinafter referred to as "makeup") is in fashion or will be in fashion.

For example, a makeup artist analyzes a large number of photographs in fashion magazines, and determines that "coral pink blushes are coming into fashion". However, in the case where there is a diversity of makeups (or makeup trends), or in the case where a change in a makeup trend is not clear, it takes time and effort to perform an accurate analysis.

Accordingly, it is conceivable to analyze a makeup trend by using a makeup simulator that overlays and displays, on a facial image, an image (makeup part image) showing the state of makeup applied on a face. Makeup simulators described in PTL 1 and PTL 2 present a plurality of makeups prepared in advance as options, and receive a selection operation. By collecting such selection results and performing a process such as a known time series analysis, which of the plurality of makeups is in fashion or is coming into fashion can be accurately and easily analyzed.

CITATION LIST

Patent Literature

PTL 1: Unexamined Japanese Patent Publication No. 2001-346627

PTL 2: Unexamined Japanese Patent Publication No. 2007-175384

However, with the method described above, if makeup not belonging to any of the plurality of makeups prepared in advance comes into fashion, a makeup trend cannot be correctly analyzed. Accordingly, a technology that allows a makeup trend to be easily and more accurately determined based on analysis of a makeup facial image is desired.

SUMMARY

One non-limiting and exemplary embodiment provides a makeup trend analyzing apparatus, a makeup trend analyzing method, and a non-transitory computer-readable recording medium storing a makeup trend analyzing program that allow a makeup trend to be easily and more accurately determined based on analysis of a makeup facial image.

In one general aspect, the techniques disclosed here feature a makeup trend analyzing apparatus including a facial feature point acquiring unit that acquires a facial feature point within a makeup facial image that is an image of a face on which makeup is applied, a makeup feature point acquiring unit that acquires a makeup feature point within the makeup facial image, a makeup information generator that generates, based on the facial feature point and the makeup feature point, makeup information quantitatively indicating positional information of the makeup feature point in a face coordinate system that takes the facial feature point as a reference, a trend analyzer that analyzes the makeup information acquired from a plurality of the makeup facial images, and determines a makeup trend, and an analysis result output unit that performs an information output process according to a determination result of the makeup trend.

According to the present disclosure, a makeup trend may be easily and more accurately determined based on analysis of a makeup facial image.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Additionally, these general and specific aspects may be implemented by a system, a method, an integrated circuit, a computer program, or a recording medium, or by an arbitrary combination of a system, an apparatus, a method, an integrated circuit, a computer program, and a recording medium.

BRIEF DESCRIPTION OF THE DRAWINGS

FIG. 3 is a diagram showing an example of facial feature point extraction information according to the present exemplary embodiment;

FIG. 4 is a diagram showing an example of makeup feature point extraction information according to the present exemplary embodiment;

FIG. 6 is a diagram showing an example of analysis target calculation information according to the present exemplary embodiment;

FIG. 9 is a diagram showing an example of makeup information (group) according to the present exemplary embodiment;

FIG. 10 is a diagram showing an example of makeup trend information according to the present exemplary embodiment.

DETAILED DESCRIPTION

Hereinafter, an exemplary embodiment of the present disclosure will be described in detail with reference to the drawings.

System Configuration

First, a configuration of a makeup support system including a makeup trend analyzing apparatus according to the present exemplary embodiment will be described.

Figure 1:
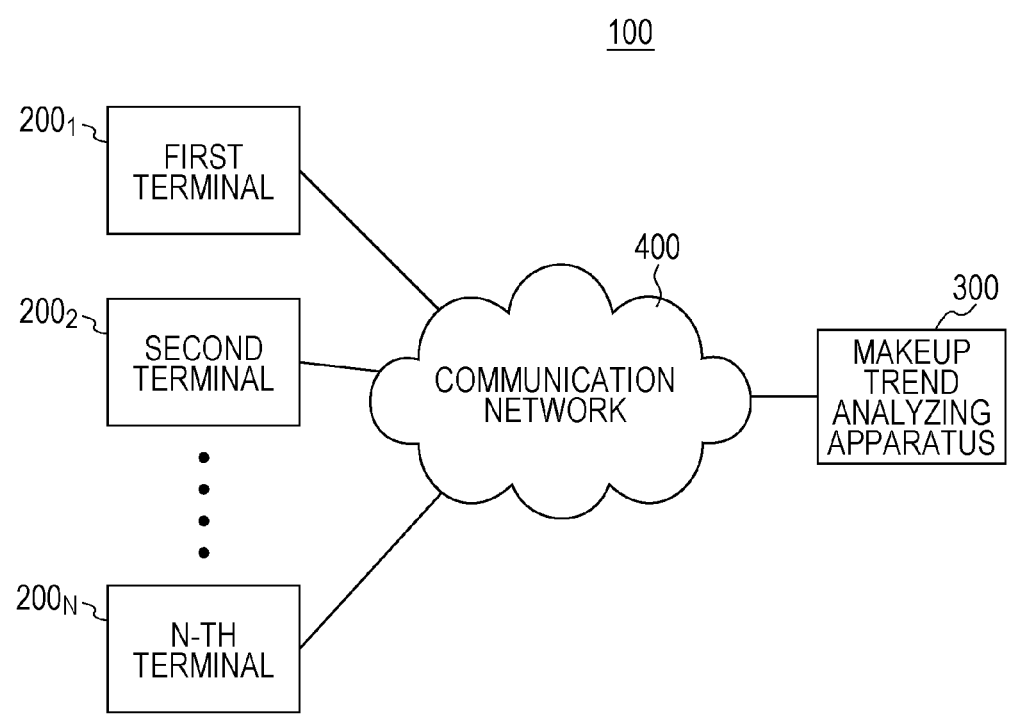
FIG. 1 is a system configuration diagram showing an exemplary configuration of a makeup support system according to a present exemplary embodiment.

FIG. 1 is a system configuration diagram showing an exemplary configuration of the makeup support system.

In FIG. 1, makeup support system 100 includes first to N-th terminals $200_1$ to $200_N$, and makeup trend analyzing apparatus 300. First to N-th terminals $200_1$ to $200_N$, and makeup trend analyzing apparatus 300 are each connected to communication network 400 such as the Internet.

First to N-th terminals $200_1$ to $200_N$ are each an information processing apparatus provided with a camera, and is a personal computer, a smartphone, a tablet terminal, or a digital camera, for example. Each terminal 200 captures, autonomously or in response to a request from makeup trend analyzing apparatus 300, an image of a face on which makeup is applied (hereinafter referred to as "makeup facial image"), and transmits the captured makeup facial image to makeup trend analyzing apparatus 300.

Makeup trend analyzing apparatus 300 collects makeup facial images from first to N-th terminals $200_1$ to $200_N$ over communication network 400, analyzes a large number of collected makeup facial images, and determines a makeup trend. More specifically, makeup trend analyzing apparatus 300 acquires makeup information from each makeup facial image. The makeup information is information quantitatively indicating positional information of a makeup feature point in a face coordinate system which takes a facial feature point as a reference. Makeup trend analyzing apparatus 300 analyzes makeup information acquired from a large number of makeup face images, and determines a makeup trend.

The facial feature point is a point defining an arrangement (position, size, shape, tilt, etc.) of a facial part such as an inner corner of an eye or an inner end of an eyebrow. More particularly, the facial feature point is a point which is highly related to an arrangement of a makeup part such as an eyeshadow or an eyebrow makeup. Furthermore, the makeup feature point is a point defining an arrangement of a makeup part such as an end portion of an eyeshadow or a thickness of an eyebrow makeup. More particularly, the makeup feature point is a point, the relative position of which to a facial feature point is easily changed depending on the makeup, and which easily affects the impression of an appearance by having the relative position changed. That is, the makeup information is information indicating a feature regarding an arrangement of makeup in a manner allowing mathematical analysis.

Then, makeup trend analyzing apparatus 300 performs an information output process according to the determination result. For example, such an information output process includes a process of transmitting, to one of terminals 200, makeup trend information indicating makeup which is estimated to come into fashion.

Makeup support system 100 as described above may collect a plurality of makeup facial images, and may determine a makeup trend from the collected makeup facial images.

Apparatus Configuration

Next, a configuration of makeup trend analyzing apparatus 300 will be described.

Figure 2:
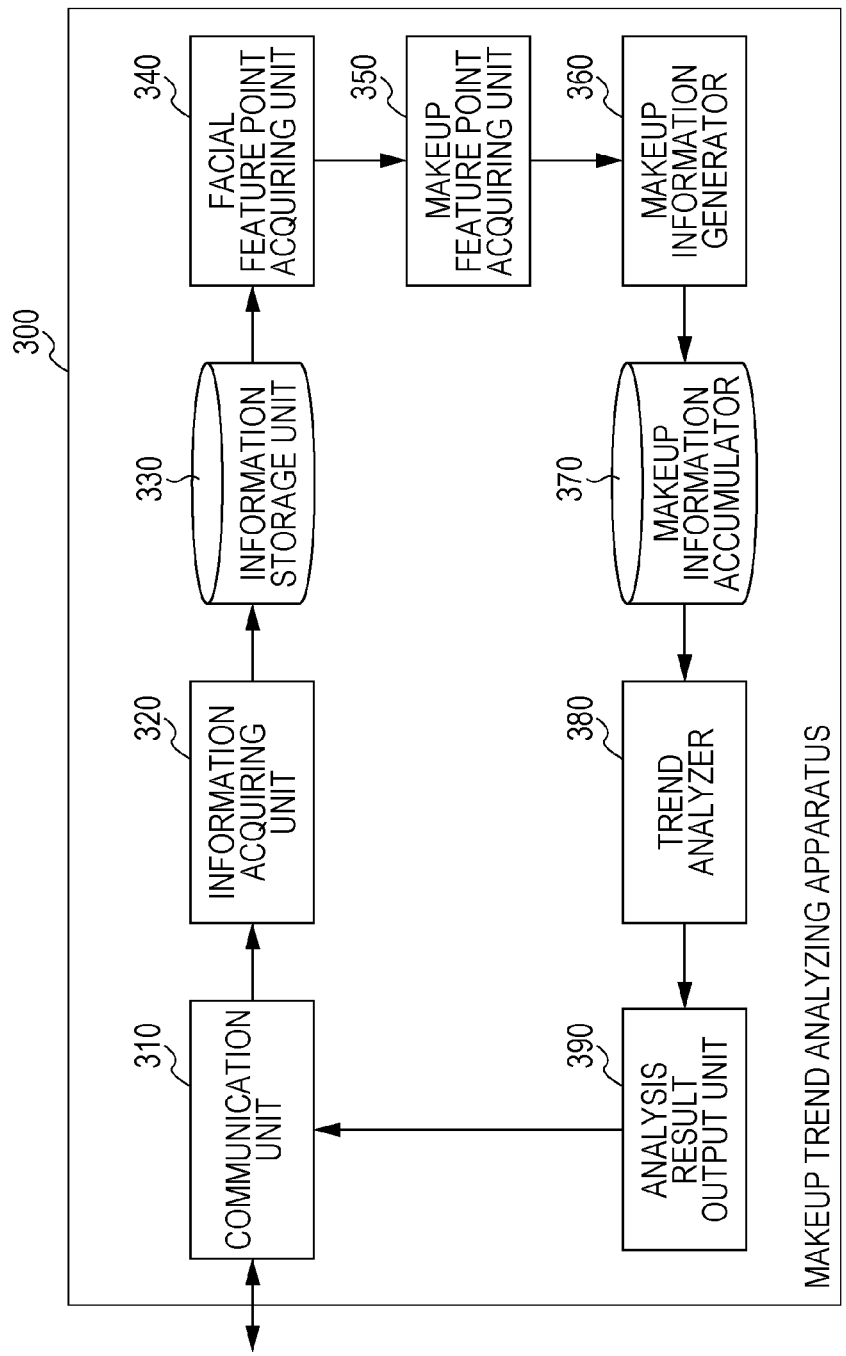
FIG. 2 is a block diagram showing an exemplary configuration of a makeup trend analyzing apparatus according to the present exemplary embodiment.

FIG. 2 is a block diagram showing an exemplary configuration of makeup trend analyzing apparatus 300. Additionally, arrows in the drawing indicate main flows of pieces of information, and do not necessarily mean that pieces of information do not flow in an opposite direction.

In FIG. 2, makeup trend analyzing apparatus 300 includes communication unit 310, information acquiring unit 320, information storage unit 330, facial feature point acquiring unit 340, makeup feature point acquiring unit 350, makeup information generator 360, makeup information accumulator 370, trend analyzer 380, and analysis result output unit 390.

Communication unit 310 performs communication with each of first to N-th terminals $200_1$ to $200_N$ over communication network 400.

Information acquiring unit 320 acquires, from each terminal 200, by using communication unit 310, a makeup facial image captured by terminal 200, and attribute information indicating an attribute of the makeup facial image. For example, the attribute information includes an attribute of a user with makeup on the face (user ID, age, sex, district, etc.), a type of a cosmetic used for makeup (cosmetic company, cosmetic model number, color information, etc.), a style of makeup such as punk or business, and an attribute of the face's owner (facial feature, age, sex, etc.).

Furthermore, information acquiring unit 320 also acquires time information indicating time when makeup in a makeup facial image has been applied. For example, such time information may be date/time of receiving the makeup facial image, or date/time of capturing the makeup facial image, received together with the makeup facial image from terminal 200. Information acquiring unit 320 stores a set of acquired makeup facial image, attribute information, and time information in information storage unit 330.

Information storage unit 330 holds the information stored by information acquiring unit 320 in a manner allowing reading by facial feature point acquiring unit 340.

Facial feature point acquiring unit 340 reads out the set of makeup facial image, attribute information, and time information stored in information storage unit 330, and acquires a facial feature point from the makeup facial image. Acquisition of a facial feature point may be performed by extracting a facial feature point from a makeup facial image by a known image analysis scheme such as pattern matching. Alternatively, acquisition of a facial feature point may be performed by displaying a makeup facial image on a display with a touch panel or the like, and receiving an operation of setting a facial feature point from a user. Then, facial feature point acquiring unit 340 outputs, to makeup feature point acquiring unit 350, information indicating a position of the facial feature point, and the set of makeup facial information, attribute information, and time information.

For example, facial feature point acquiring unit 340 stores in advance facial feature point extraction information defining a facial feature point, and each facial feature point is extracted according to the facial feature point extraction information.

FIG. 3 is a diagram showing an example of the facial feature point extraction information.

As shown in FIG. 3, facial feature point extraction information 510 describes facial feature point ID 511 and facial feature point name 512, and information 513 for facial feature point extraction necessary for extraction of a corresponding facial feature point from a makeup face image, the pieces of information being set for each type of facial feature point.

Makeup feature point acquiring unit 350 in FIG. 2 acquires a makeup feature point from the makeup facial information. Acquisition of a makeup feature point may be performed by extracting a makeup feature point from a makeup facial image by a known image analysis scheme such as pattern matching, or may be performed by displaying a makeup facial image on a display with a touch panel or the like, and receiving an operation of setting a makeup feature point from a user. Then, makeup feature point acquiring unit 350 outputs, to makeup information generator 360, positional information indicating each position of a makeup feature point and a facial extraction point, and a set of attribute information and time information.

For example, makeup feature point acquiring unit 350 extracts a skin color portion from the makeup facial image, and extracts an edge of a region which is continuous with an approximate color and the color of which is different from the skin color portion by a predetermined level or higher. Then, a closed region where a cosmetic is applied with one makeup item is detected as a makeup part, based on a size, a shape, and a relative position to each facial feature point, and the like of the aforementioned region. For example, makeup feature point acquiring unit 350 stores in advance makeup feature point extraction information defining a makeup feature point, and extracts each makeup feature point according to the makeup feature point extraction information.

FIG. 4 is a diagram showing an example of the makeup feature point extraction information.

As shown in FIG. 4, makeup feature point extraction information 520 describes makeup part ID 521 and makeup part name 522, which are set for each type of makeup part. Furthermore, makeup feature point extraction information 520 describes makeup feature point ID 523 and makeup feature point name 524, and information 525 for makeup feature point extraction necessary for extraction of a corresponding makeup feature point from a makeup facial image, the pieces of information being set for each type of makeup feature point in association with makeup part ID 521.

Figure 5:
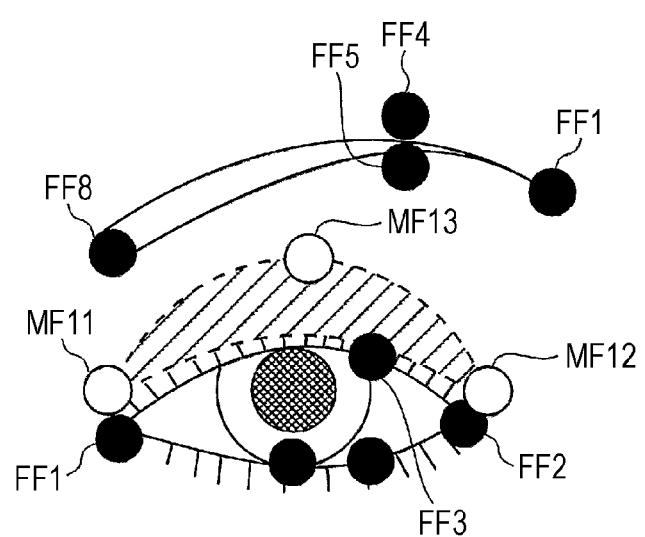
FIG. 5 is a diagram showing examples of a facial feature point and a makeup feature point according to the present exemplary embodiment.

FIG. 5 is a diagram showing examples of the facial feature point and the makeup feature point which are target of acquisition by makeup trend analyzing apparatus 300.

In FIG. 5, black circles indicate examples of the facial feature point acquired by facial feature point acquiring unit 340, and white circles indicate examples of the makeup feature point acquired by makeup feature point acquiring unit 350. In this case, facial feature point IDs 511 shown in FIG. 3 and makeup feature point IDs 523 shown in FIG. 4 are assigned.

Additionally, makeup feature point acquiring unit 350 may generate a makeup part image indicating an application region of a cosmetic, based on the makeup facial image, for generation of a makeup simulation image described later. In this case, the position of each makeup feature point (hereinafter referred to as "reference point position") in a coordinate system of the generated makeup part image is acquired, and is output to makeup information generator 360 together with the makeup part image and other pieces of information.

Makeup information generator 360 in FIG. 2 generates (calculates) makeup information that quantitatively indicates information about the position of a makeup feature point in a face coordinate system which takes the facial feature point as a reference, based on positional information of the facial feature point and the makeup feature point. For example, the makeup information includes a vector, in the face coordinate system, which takes a predetermined one of the facial feature point and the makeup feature point as a start point and the other as an end point (hereinafter such a vector will be referred to as "tendency analysis vector" as appropriate), that is, a relative position of a predetermined makeup feature point to a predetermined facial feature point. For example, the tendency analysis vector includes an X-coordinate value and a Y-coordinate value of the facial feature point, and an X-coordinate value and a Y-coordinate value of the makeup feature point.

The makeup information is a target of analysis for determining a makeup trend, and will be referred to below as "analysis target" as appropriate. Makeup information generator 360 includes corresponding attribute information and time information in the generated makeup information. Moreover, makeup information generator 360 stores the generated makeup information in makeup information accumulator 370.

For example, makeup information generator 360 stores in advance analysis target calculation information defining an analysis target, and calculates each analysis target according to the analysis target calculation information. Additionally, makeup information generator 360 may acquire the analysis target calculation information from outside at the start of analysis.

FIG. 6 is a diagram showing an example of the analysis target calculation information.

As shown in FIG. 6, analysis target calculation information 530 describes, for each analysis target ID 533 associated with makeup part ID 531 and makeup part name 532, analysis target name 534 and analysis target definition 535. For example, within analysis target ID 533 of "Al13", which is related to eyeshadow, analysis target name 534 of "eyeshadow upper-side shape" and analysis target definition 535 of "vector FF3→MF13" are described in association. An analysis target which is defined as above is a tendency analysis vector which quantitatively indicates distance and direction from a highest point of an upper lid of an eye to a highest point of an upper edge of an eyeshadow application region, that is, a feature of a makeup part corresponding to a shape of an eyeshadow.

Figure 7A:
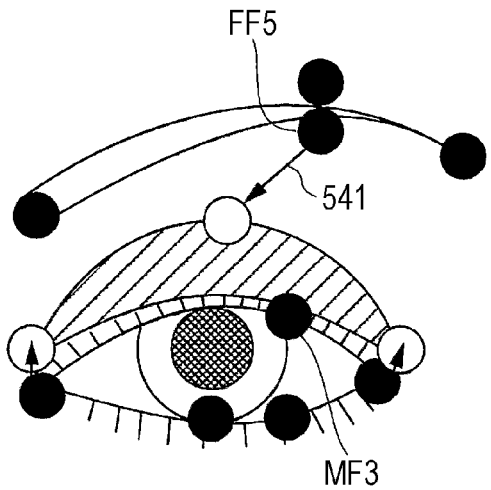
FIG. 7A is a diagram showing an example of a tendency analysis vector according to the present exemplary embodiment.
Figure 7B:
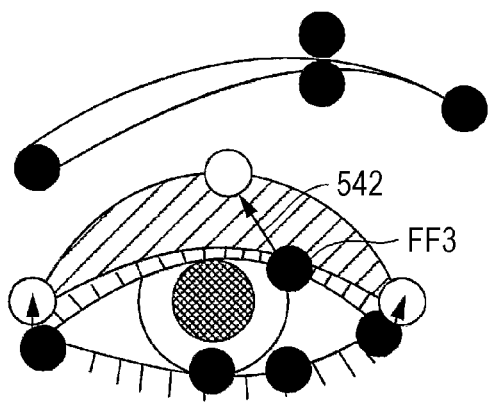
FIG. 7B is a diagram showing another example of the tendency analysis vector according to the present exemplary embodiment.
Figure 7C:
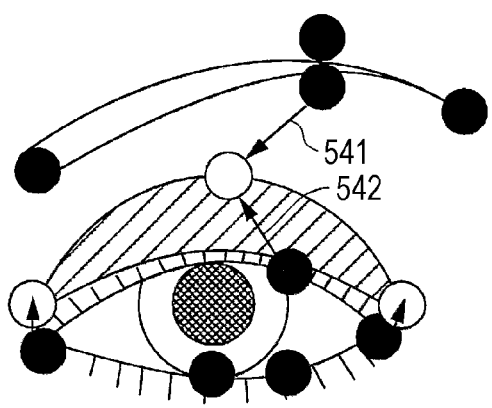
FIG. 7C is a diagram showing another example of the tendency analysis vector according to the present exemplary embodiment.

As the analysis target, various examples are conceivable other than the example shown in FIG. 6. Example variations of the tendency analysis vector are shown in FIGS. 7A to 7C. FIGS. 7A to 7C correspond to FIG. 5. In FIGS. 7A to 7C, each arrow indicates the tendency analysis vector which is calculated.

FIG. 7A is an example of the tendency analysis vector for a case of analyzing how close an eyeshadow is to an eyebrow. In this case, for example, tendency analysis vector 541 which takes a highest point of a lower edge of the eyebrow (FF5) as a start point and highest point MF13 of the upper edge of the eyeshadow as an end point is calculated.

FIG. 7B is an example of the tendency analysis vector for a case of analyzing how far spread the eyeshadow is from the eye. In this case, for example, tendency analysis vector 542 which takes a highest point of the upper lid (FF3) as a start point and highest point MF13 of the upper edge of the eyeshadow as an end point is calculated.

FIG. 7C is an example of the tendency analysis vector for a case of analyzing how far spread the eyeshadow is with reference to both the eye and the eyebrow. In this case, for example, both of tendency analysis vectors 541, 542 described above are calculated.

Additionally, the analysis target may include not only the tendency analysis vector, but also a color, application density (transparency), area and the like. Furthermore, the analysis target may include a distance between a plurality of facial feature points in the face coordinate system, or a distance between a plurality of makeup feature points in an area of a predetermined region formed by a plurality of facial feature points, or a ratio of areas of predetermined regions formed by a plurality of facial feature points, for example.

Furthermore, makeup information generator 360 desirably includes the makeup part image and information indicating the reference point position in the makeup information, for generation of a makeup simulation image described later.

Makeup information accumulator 370 in FIG. 2 holds information stored by makeup information generator 360 while allowing trend analyzer 380 to read the information. New pieces of makeup information are stored in makeup information accumulator 370 over time such that a large number of pieces of makeup information will be accumulated.

Trend analyzer 380 analyzes makeup information acquired from a large number (a plurality of) makeup facial images and accumulated in makeup information accumulator 370, and determines a makeup trend. More specifically, for example, trend analyzer 380 performs a statistical analysis on the makeup information, for each type of tendency analysis vector (for each analysis target ID), by using a known time series analysis scheme such as a moving average method. Then, trend analyzer 380 outputs a makeup trend determination result to analysis result output unit 390.

Because the time information is included in the makeup information, trend analyzer 380 is capable of determining which makeup is coming into fashion or which makeup is starting to go out of fashion, in addition to which makeup is in fashion.

For example, trend analyzer 380 analyzes following items. Trend analyzer 380 reads out an appropriate analysis target (makeup information) according to details of a trend desired to be determined, and performs an analysis by a known analysis scheme.

Position where makeup is preferably arranged with respect to facial part
Whether eyeshadow is preferably spread to near eyebrow
Whether eyeshadow is preferably stopped near eye
Whether long eyebrow makeup is preferred
Whether short eyebrow makeup is preferred
Whether highly arched eyebrow makeup is preferred
Whether large eyeshadow application region is preferred
Whether large eyebrow makeup application region is preferred
Which color is preferred for eyeshadow
Whether each tendency mentioned above is on rise or decline
Proportion of area of makeup part to entire face
Increase/decrease or rate of increase/decrease in proportion of area relative to another makeup part
Whether long eyelashes are preferred
Whether dense eyelashes are preferred
Whether clear (thick) eyeliner is preferred
Whether light-colored highlighter is preferred
Whether highly contrasted contour (outline) is preferred
Portion where shading is preferably applied
Speed of rise (or decline) of each tendency mentioned above Additionally, because the attribute information is included in the makeup information, trend analyzer 380 is able to determine what trend exists for which generation or in which district. Moreover, because a plurality of pieces of makeup information are associated with a same makeup facial image (attribute information thereof), trend analyzer 380 is able to analyze a relationship between the pieces of makeup information. Furthermore, trend analyzer 380 may acquire various other pieces of information to use the information in analysis.

For example, trend analyzer 380 may analyze a relationship between a tendency of a makeup part and a change in color (direction of brighter/darker color, density (gradation)). By analyzing a relationship with respect to a difference in the density of a plurality of parts, a tread such as contouring makeup which emphasizes the outline of a facial part can be analyzed. Furthermore, trend analyzer 380 may also analyze a relationship between the tendency of a makeup part and a user attribute (place of residence (city, suburb), age, high school student, etc.) of a provider of a makeup facial image, or the social situation (economic environment, fashion trends, etc.). Moreover, trend analyzer 380 may quantify trends provided by a business operator by a similar scheme, and may perform an analysis to extract the manner of difference to trends among general users or to extract only a new trend by eliminating (a specific large number of) trends which are already widespread to a certain extent.

Analysis result output unit 390 performs an information output process according to a makeup trend determination result. For example, when there is a request for information about a makeup trend from one of terminals 200, analysis result output unit 390 receives such a request through communication unit 310, and returns makeup trend information indicating a latest makeup trend determination result. Additionally, for example, analysis result output unit 390 may transmit the makeup trend information to terminal 200 under a condition that a makeup facial image has been transmitted or predetermined user authentication has been successfully performed.

For example, the makeup trend information may be a makeup simulation image that is obtained by overlaying, on a facial image, a makeup part image showing a state where makeup which is estimated to come into fashion is applied on a face. That is, analysis result output unit 390 may cause a makeup simulation image to be displayed on terminal 200 by using a technique described in PTL 1 and PTL 2, for example. Furthermore, the makeup trend information may be a simulation image of makeup which is currently in fashion, to which an arrow image, a text, audio or the like indicating tendency of a change in a shape is added. Alternatively, the makeup trend information may be information indicating a makeup trend using a graph or a table.

Although not shown in the drawings, makeup trend analyzing apparatus 300 includes, for example, a central processing unit (CPU), a storage medium such as a read only memory (ROM) storing control programs, a work memory such as a random access memory (RAM), and a communication circuit. In this case, the functions of the above-described units are realized by the CPU executing the control programs.

According to such a configuration, makeup trend analyzing apparatus 300 may acquire, from a makeup facial image, makeup information quantitatively indicating each makeup part feature, analyze the makeup information acquired from a large number of makeup facial images, and determine a makeup trend.

Apparatus Operation

Next, an operation of makeup trend analyzing apparatus 300 will be described.

Figure 8:
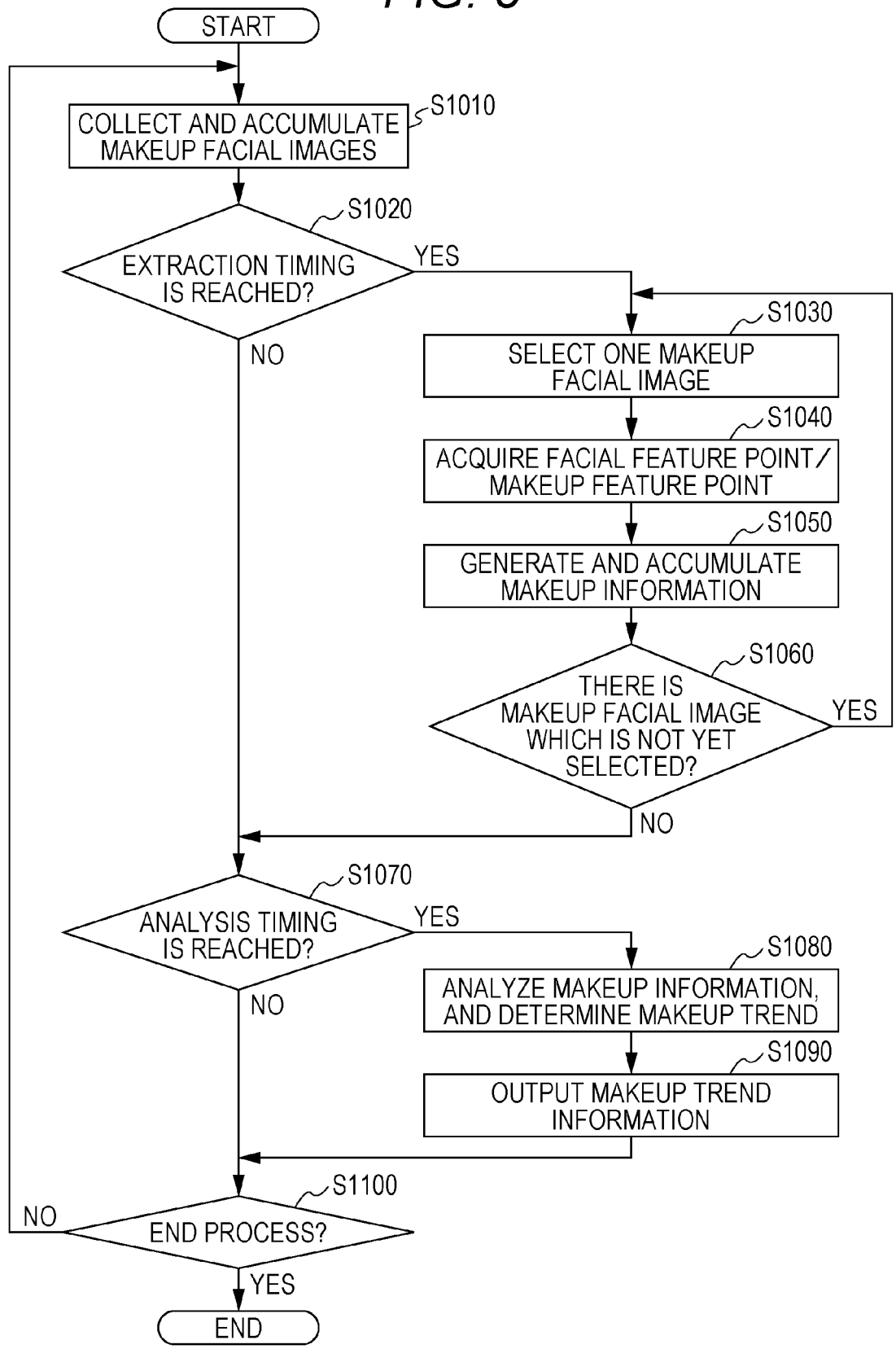
FIG. 8 is a diagram showing a flowchart showing an exemplary operation of the makeup trend analyzing apparatus according to the present exemplary embodiment.

FIG. 8 is a flowchart showing an exemplary operation of makeup trend analyzing apparatus 300.

In step S1010, information acquiring unit 320 performs collection, and accumulation in information storage unit 330, of makeup facial images from first to N-th terminals $200_1$ to $200_N$.

In step S1020, facial feature point acquiring unit 340 determines whether a timing of extracting makeup information (tendency analysis vector, etc.) from the accumulated makeup facial images (hereinafter such a timing will be referred to as "extraction timing") is reached or not. The extraction timing is a timing which is periodically reached each day, or a timing when a makeup face photograph is transmitted from a user of one of terminals 200 or makeup trend analyzing apparatus 300, or a timing when an instruction for analysis is issued. In the case where the extraction timing is reached (S1020: YES), facial feature point acquiring unit 340 proceeds to step S1030. In the case where the extraction timing is not reached (S1020: NO), facial feature point acquiring unit 340 proceeds to step S1070 described later.

In step S1030, facial feature point acquiring unit 340 selects, from the makeup facial images stored in information storage unit 330, one makeup facial image which is to be the target of a current analysis. For example, a makeup facial image which is to be the target of an analysis is a makeup facial image which has been transmitted together with an analysis instruction, or a makeup facial image which matches attribute information of the user of terminal 200 which has issued an instruction for analysis.

In step S1040, facial feature point acquiring unit 340 acquires a facial feature point in the currently selected makeup facial image. Makeup feature point acquiring unit 350 also acquires a makeup feature point in the currently selected makeup facial image.

In step S1050, makeup information generator 360 generates makeup information (tendency analysis vector, etc.) based on the acquired facial feature point and makeup feature point, and accumulates the makeup information in makeup information accumulator 370.

In step S1060, facial feature point acquiring unit 340 determines whether or not there is a makeup facial image which is not yet selected (which is not yet subjected to the processes in steps S1030 to S1050), in the makeup facial images which are targets of the current analysis. In the case where there is a makeup facial image which is not yet selected (S1060: YES), facial feature point acquiring unit 340 returns to step S1030. In the case where there is no makeup facial image which is not yet selected (S1060: NO), facial feature point acquiring unit 340 proceeds to step S1070 described later.

When the processes of steps S1030 to S1060 are repeated, the pieces of makeup information about a large number of makeup facial images are accumulated in makeup information accumulator 370.

FIG. 9 is a diagram showing an example of makeup information (group) accumulated in makeup information accumulator 370.

As shown in FIG. 9, makeup information (group) 610 describes a set of sample ID 611 indicating which makeup facial image the information is based on, attribute information 612, time information 613, makeup part ID 614, and makeup part name 615. Furthermore, makeup information (group) 610 describes value 617 for each analysis target ID 616 which is associated with such a set of information. Analysis target ID 616 is based on analysis target ID 533 (see FIG. 6) in analysis target calculation information 530.

For example, analysis target ID 616 of "Al13" is associated with sample ID 611 of "S1", attribute information 612 of "U1", time information 613 of "T1", makeup part ID 614 of "Ml1", and makeup part name 615 of "eyeshadow". Furthermore, value 617 of "V3" is described in association with analysis target ID 616 of "Al13". This indicates that an eyeshadow included in a makeup facial image having attribute U1 at time T1 has a feature of a shape represented by value "V3".

In step S1070, trend analyzer 380 determines whether or not a timing of analyzing accumulated makeup information and determining a makeup trend (hereinafter such a timing will be referred to as "analysis timing") is reached. The analysis timing is a timing which is periodically reached each day, or a timing when an instruction for an analysis is issued by a user of one of terminals 200 or makeup trend analyzing apparatus 300. In the case where the analysis timing is reached (S1070: YES), trend analyzer 380 proceeds to step S1080. In the case where the analysis timing is not reached (S1070: NO), trend analyzer 380 proceeds to step S1100 described later.

Additionally, in the case where the extraction timing described above and the analysis timing are the same, makeup support system 100 may proceed from step S1060 to step S1080 without performing the determination process in step S1070.

In step S1080, trend analyzer 380 analyzes a large number of makeup information groups which are accumulated, determines a makeup trend, and generates makeup trend information indicating the result of determination.

Additionally, for example, trend analyzer 380 sorts pieces of analysis target makeup information into groups based on a predetermined criterion, and analyzes the makeup information on a per group basis. Such sorting into groups may be performed based on attributes indicated by the attribute information (age-group, district, facial feature such as round face or square face, genre of makeup, etc.), a feature of a makeup part (blue-based or brown based, etc.), or a feature of another makeup part applied on the same face (whether a blusher is circular or triangular, etc.), for example.

FIG. 10 is a diagram showing an example of the makeup trend information.

As shown in FIG. 10, makeup trend information 620 describes a set of attribute group 621, makeup part ID 622, and makeup part name 623. Moreover, makeup trend information 620 describes, for each analysis target ID 624 associated with each of such sets, average value 625 of values 617 (see FIG. 9) and predicted average value 626 after one month. Analysis target ID 624 is based on analysis target ID 533 (see FIG. 6) in analysis target calculation information 530.

For example, attribute group 621 of "G1" is associated with analysis target ID 624 of "Al13". Moreover, average value 625 of "AV3" and predicted average value 626 after one month of "PV3" are described in association with analysis target ID 624 of "Al13". This indicates that an eyeshadow having a shape represented by value "AV3" is in fashion among users belonging to attribute group G1, and that an eyeshadow having a shape represented by value "PV3" is predicted to come into fashion after one month.

In step S1090 in FIG. 8, analysis result output unit 390 outputs makeup trend information indicating a makeup trend determination result. For example, analysis result output unit 390 transmits, to terminal 200 which has issued an instruction for the analysis, makeup trend information matching the attribute information of terminal 200 in question.

An average value or a predicted average value of the tendency analysis vector included as a makeup trend in the makeup trend information is information indicating the position of a makeup feature point in the face coordinate system which takes a facial feature point as the reference, as described above. Accordingly, a makeup simulator may generate a makeup part image matching the makeup trend, based on the tendency analysis vector, the makeup part image described above, and the reference point position acquired for the makeup part image. For this purpose, analysis result output unit 390 desirably includes, in the makeup trend information, the makeup part image and information indicating the reference point position.

Then, in step S1100, information acquiring unit 320 determines whether or not there is an instruction, such as a user instruction, to end the process. In the case where there is no instruction to end the process (S1100: NO), information acquiring unit 320 returns to step S1010. In the case where there is an instruction to end the process (S1100: YES), information acquiring unit 320 ends the series of processes.

By the operation as described above, makeup trend analyzing apparatus 300 is able to analyze the makeup information and determine a makeup trend at a predetermined timing, and may transmit the makeup trend information.

Example Application of System

Makeup support system 100 as described above can be applied in various environments.

Figure 11:
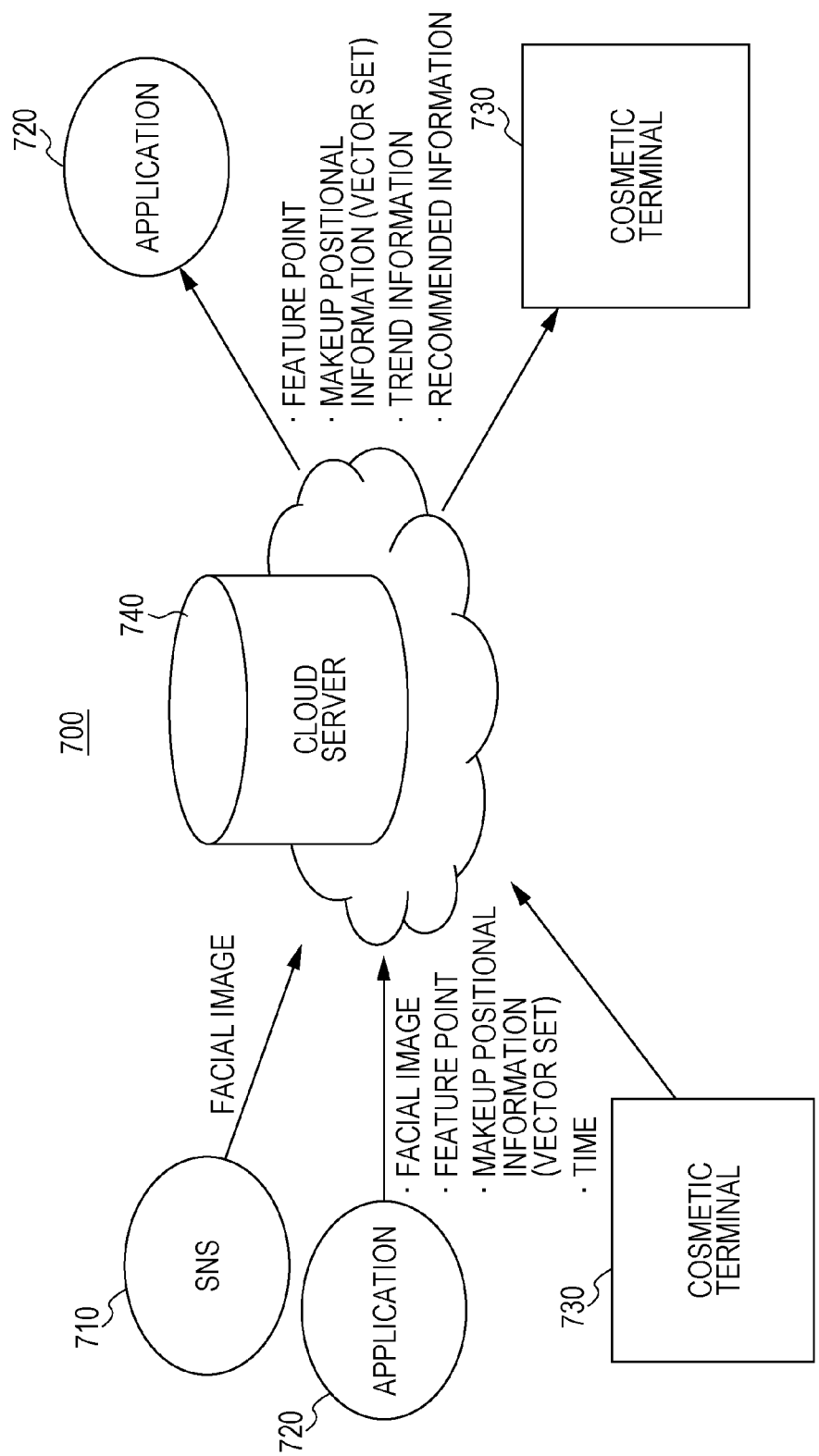
FIG. 11 is a diagram showing an example application of the makeup support system according to the present exemplary embodiment.

FIG. 11 is a diagram showing an example application of makeup support system 100.

As shown in FIG. 11, system environment 700 where makeup support system 100 is applied is formed of one or more social networking services (SNS) 710, one or more applications (application software) 720, one or more cosmetic terminals 730, and cloud server 740, for example.

SNS 710 and application 720 are functions realized by a terminal owned by an individual, such as a personal computer or a smartphone, and the Internet, for example. Furthermore, cosmetic terminal 730 is a terminal, in a shop, provided with a digital mirror having a camera and a liquid crystal display disposed on a rear side of a semitransparent mirror, for example.

For example, SNS 710 and application 720 perform capturing or generation of a makeup facial image by an individual user, and uploads an acquired makeup facial image to cloud server 740. Furthermore, cosmetic terminal 730 performs capturing of a makeup facial image of a customer at a cosmetic shop by being operated by a clerk at the shop, and uploads the acquired makeup facial image to cloud server 740, for example.

SNS 710 and application 720 download the makeup trend information from cloud server 740, and display a makeup simulation image or provide advice regarding makeup to the user. Furthermore, cosmetic terminal 730 downloads the makeup trend information from cloud server 740, and displays a makeup simulation image or provides advice regarding makeup to the clerk or the customer. For example, the makeup simulation image can be generated by overlaying a makeup part image while adjusting the reference point positions described above in accordance with the makeup feature points, on the facial image, extracted from the makeup trend information, and by changing the shape or the color of the makeup part image according to the makeup trend indicated by the makeup trend information.

Cloud server 740 generates the makeup trend information based on a large number of makeup facial images uploaded by SNS 710, application 720, and cosmetic terminal 730, and accepts download of the makeup trend information.

That is, each of SNS 710, application 720, and cosmetic terminal 730 corresponds to terminal 200 of makeup support system 100. Furthermore, cloud server 740 corresponds to makeup trend analyzing apparatus 300 of makeup support system 100.

Additionally, terminal 200, such as SNS 710, application 720, or cosmetic terminal 730, may include a function of correcting, according to a trend, image data of a makeup part indicated by the makeup trend information or data of an existing makeup part image which is used in the makeup simulation image. Furthermore, terminal 200 may display a trend tendency graph or a graph indicating a makeup trend by using a diagram and arrows (trend diagram), or information indicating, in percentage or the like, how well matched the makeup selected by a user is with a trend or whether the impression is positive. Terminal 200 may evaluate makeup on a per makeup part basis, or may perform evaluation of the entire face, instead of an individual part, by weighting each part based on which facial part (such as an eye) is important.

Furthermore, for example, terminal 200 may print, using a cosmetic, makeup which is indicated by the makeup trend information as currently in fashion or coming into fashion on a biocompatible and elastic sheet which can transfer a material to be printed onto the face of a person. Moreover, terminal 200 may further analyze the contents of the makeup trend information.

Furthermore, for example, one or some of functional sections of makeup trend analyzing apparatus 300, such as facial feature point acquiring unit 340, makeup feature point acquiring unit 350, and makeup information generator 360, may be disposed on the side of SNS 710, application 720, or cosmetic terminal 730. In this case, SNS 710, application 720, or cosmetic terminal 730 including such a functional section transmits the makeup information (including makeup part image and information indicating the reference point position) to cloud server 740, for example.

Additionally, usage of makeup support system 100 is not limited to such an example. For example, the makeup trend information may be provided to be used by a cosmetics manufacturer to develop a product or to grasp the tendency by using a trend graph or a trend diagram. Furthermore, makeup trend analyzing apparatus 300 may analyze the tendency of preferences of an individual based on use at an individual's home, or may make proposals or perform navigation with respect to makeup which would match preferences (latent, manifest) of a user. In the case of use at the home of a user, a usage is conceivable according to which the user captures a face photograph by using makeup trend analyzing apparatus 300, checks whether the user's makeup gives a good impression, and re-applies makeup depending on the impression.

Effects of Present Exemplary Embodiment

As described above, makeup trend analyzing apparatus 300 according to the present exemplary embodiment includes facial feature point acquiring unit 340 that acquires a facial feature point within a makeup facial image, and makeup feature point acquiring unit 350 that acquires a makeup feature point within the makeup facial image.

Furthermore, makeup trend analyzing apparatus 300 includes makeup information generator 360 that generates, based on the facial feature point and the makeup feature point, makeup information quantitatively indicating positional information of the makeup feature point in a face coordinate system that takes the facial feature point as a reference. Moreover, makeup trend analyzing apparatus 300 includes trend analyzer 380 that analyzes the makeup information acquired from a plurality of the makeup facial images, and determines a makeup trend, and analysis result output unit that performs an information output process according to a determination result of the makeup trend.

According to such a configuration, makeup trend analyzing apparatus 300 can easily and more accurately determine a makeup trend based on analysis of a makeup facial image.

Example Modification of Present Exemplary Embodiment

Additionally, the makeup facial image as a target of analysis is not limited to the example described above. The makeup facial image as a target of analysis may be an image obtained by capturing of a printed material such as a magazine or a painting, an image obtained by capturing the face of a mannequin, or an image created by computer graphics, for example.

Furthermore, a method for collecting the makeup facial images is not limited to the example described above. For example, makeup trend analyzing apparatus 300 may acquire the makeup facial image by performing capturing by using a camera provided in makeup trend analyzing apparatus 300, or may acquire the makeup facial image through a universal serial bus (USB) cable or various other communication networks, or may acquire the makeup facial image from an image storage server on a communication network.

Furthermore, the makeup part which is the target of determination of a makeup trend is not limited to the examples described above. Targets of determination of a makeup trend may include eyeliner, highlighter, blusher, lip makeup, base makeup, mascara applied to eyelashes, and the like. Moreover, a decoration sticker may be included as a makeup part, in addition to makeup. In the case of including a decoration sticker as a makeup part, a trend may be analyzed for the decoration sticker by the color, shape, or position of attachment of the decoration sticker.

Furthermore, the method for analyzing the makeup information is not limited to the example described above. For example, as the method for analysis, a change over time of a value as an analysis target may be estimated by a least squares method, or analysis targets may be sorted into groups according to levels of the values and a group with the largest number of belonging analysis targets may be determined.

Furthermore, format and contents of various pieces of information that are prepared in advance or that are generated, such as the facial feature point extraction information, the makeup feature point extraction information, the analysis target calculation information, the makeup information (group), and the makeup trend information, are not limited to the examples described above. For example, the facial feature point name, the makeup part name, the makeup feature point name, the analysis target name, and the like do not necessarily have to be included in the respective pieces of information mentioned above. Moreover, additional information, such as information about the degree of importance or about a cosmetic, may be included in each of the pieces of information mentioned above.

Furthermore, the information output process according to a makeup trend determination result is not limited to the example described above. For example, such an information output process may be a process of outputting, at makeup trend analyzing apparatus 300, an image, a text, or audio indicating a determined makeup trend. Alternatively, such an information output process may be a process of evaluating at makeup trend analyzing apparatus 300 or terminal 200, makeup which is an evaluation target, based on a determined makeup trend, and outputting an image, a text, or audio indicating the evaluation result. Alternatively, the information output process may be transmission of the makeup trend information to an apparatus other than terminals 200 from which the makeup facial images are to be collected.

Furthermore, exchange of information between devices in makeup trend analyzing apparatus 300 is not limited to the examples described above. For example, makeup feature point acquiring unit 350 and makeup information generator 360 may acquire necessary information (makeup facial image, attribute information, etc.) directly from information storage unit 330. Furthermore, for example, information acquiring unit 320 may output the makeup facial image and the attribute information directly to facial feature point acquiring unit 340, makeup feature point acquiring unit 350, or makeup information generator 360. Moreover, trend analyzer 380 may accumulate analysis results, and may return appropriate information among the accumulated analysis results in response to a request.

Still further, part of the configuration of each apparatus may be physically spaced apart from other portion of the configuration of the apparatus. In this case, the plurality of portions being spaced apart from each other must each include a communication unit for establishing communication between them. For example, part of the functions of each apparatus may be cloud-based. Alternatively, makeup trend analyzing apparatus 300 may be partially or wholly integrated with one or more or all of one or a plurality of terminals 200.

Overview of Present Disclosure

A makeup trend analyzing apparatus of the present disclosure includes a facial feature point acquiring unit that acquires a facial feature point within a makeup facial image that is an image of a face on which makeup is applied, a makeup feature point acquiring unit that acquires a makeup feature point within the makeup facial image, a makeup information generator that generates, based on the facial feature point and the makeup feature point, makeup information quantitatively indicating positional information of the makeup feature point in a face coordinate system that takes the facial feature point as a reference, a trend analyzer that analyzes the makeup information acquired from a plurality of the makeup facial images, and determines a makeup trend, and an analysis result output unit that performs an information output process according to a determination result of the makeup trend.

Additionally, with the makeup trend analyzing apparatus described above, the makeup information may include a vector, in the face coordinate system, that takes a predetermined one of the facial feature point and the makeup feature point as a start point and other of the facial feature point and the makeup feature point as an end point, and the makeup trend may include information about a tendency of the vector in the plurality of makeup facial images.

Furthermore, with the makeup trend analyzing apparatus described above, the facial feature point acquiring unit may extract the facial feature point from the makeup facial image, and the makeup feature point acquiring unit may extract the makeup feature point from the makeup facial image.

Furthermore, the makeup trend analyzing apparatus described above may further include an information acquiring unit that acquires the makeup facial image and attribute information indicating an attribute of the makeup facial image, where the trend analyzer may determine the makeup trend for each attribute indicated by the attribute information.

Furthermore, with the makeup trend analyzing apparatus described above, the makeup information may include time information indicating a time of application of the makeup in the makeup facial image, the makeup trend may include information about makeup that is estimated to come into fashion, and the information output process may include a process of presenting the makeup that is estimated to come into fashion.

Furthermore, the makeup trend analyzing apparatus described above may further include an information acquiring unit that collects, through communication, the makeup facial image from a plurality of terminals that each generate the makeup facial image, where the information output process may include a process of transmitting makeup trend information indicating the makeup that is estimated to come into fashion, to a terminal included/not included in the plurality of terminals.

Furthermore, with the makeup trend analyzing apparatus described above, the makeup information generator may hold in advance or may acquire analysis target calculation information defining an analysis target for which the makeup trend is to be analyzed, and may generate the makeup information based on the analysis target calculation information that is held or acquired.

A makeup trend analyzing method includes acquiring a facial feature point within a makeup facial image that is an image of a face on which makeup is applied, acquiring a makeup feature point within the makeup facial image, generating, based on the facial feature point and the makeup feature point, makeup information quantitatively indicating positional information of the makeup feature point in a face coordinate system that takes the facial feature point as a reference, analyzing the makeup information acquired from a plurality of the makeup facial images, and determining a makeup trend, and performing an information output process according to a determination result of the makeup trend.

A non-transitory computer-readable recording medium storing a makeup trend analyzing program of the present disclosure causes a computer to execute acquiring a facial feature point within a makeup facial image that is an image of a face on which makeup is applied, acquiring a makeup feature point within the makeup facial image, generating, based on the facial feature point and the makeup feature point, makeup information quantitatively indicating positional information of the makeup feature point in a face coordinate system that takes the facial feature point as a reference, analyzing the makeup information acquired from a plurality of the makeup facial images, and determining a makeup trend, and performing an information output process according to a determination result of the makeup trend.

The makeup trend analyzing apparatus, the makeup trend analyzing method, and the non-transitory computer-readable recording medium storing the makeup trend analyzing program according to the present disclosure are useful as a makeup trend analyzing apparatus, a makeup trend analyzing method, and a non-transitory computer-readable recording medium storing a makeup trend analyzing program which are capable of easily and more accurately determining a makeup trend based on analysis of a makeup facial image.

What is claimed is:

1. A makeup trend analyzing apparatus comprising:
a processor
that acquires a facial feature point within a makeup facial image that is an image of a face on which makeup is applied; and
that acquires a makeup feature point within the makeup facial image;
a makeup information generator that generates, based on the facial feature point and the makeup feature point, makeup information quantitatively indicating positional information of the makeup feature point in a face coordinate system that takes the facial feature point as a reference, wherein the makeup information includes a vector, in the face coordinate system, that takes as a start point a predetermined one of the facial feature point and the makeup feature point and takes as an end point the other of the facial feature point and the makeup feature point;
wherein the processor also
analyzes the makeup information acquired from a plurality of the makeup facial images, and determines a makeup trend; and
performs an information output process according to a determination result of the makeup trend.

2. The makeup trend analyzing apparatus according to claim 1, wherein
the makeup trend includes information about a tendency of the vector in the plurality of makeup facial images.

3. The makeup trend analyzing apparatus according to claim 1, wherein
the processor as part of its facial-feature-point acquiring, extracts the facial feature point from the makeup facial image, and
the processor as part of its makeup-feature-point acquiring extracts the makeup feature point from the makeup facial image.

4. The makeup trend analyzing apparatus according to claim 1, wherein the processor further acquires the makeup facial image and attribute information indicating an attribute of the makeup facial image, wherein
the processor as part of its makeup-trend determination determines the makeup trend for each attribute indicated by the attribute information.

5. The makeup trend analyzing apparatus according to claim 1, wherein
the makeup information includes time information indicating a time of application of the makeup in the makeup facial image,
the makeup trend includes information about makeup that is estimated to come into fashion, and
the information output process includes a process of presenting the makeup that is estimated to come into fashion.

6. The makeup trend analyzing apparatus according to claim 5, wherein the processor further collects, through a network communicator, the makeup facial image from a plurality of terminals that each generate the makeup facial image, wherein
the information output process includes a process of transmitting makeup trend information indicating the makeup that is estimated to come into fashion, to a terminal.

7. The makeup trend analyzing apparatus according to claim 1, wherein the makeup information generator holds in advance or acquires analysis target calculation information defining an analysis target for which the makeup trend is to be analyzed, and generates the makeup information based on the analysis target calculation information that is held or acquired.

8. A makeup trend analyzing method comprising:
executing with a processor the instructions stored in a memory to
acquire a facial feature point within a makeup facial image that is an image of a face on which makeup is applied; and
acquire a makeup feature point within the makeup facial image;
generating with a makeup information generator, based on the facial feature point and the makeup feature point, makeup information quantitatively indicating positional information of the makeup feature point in a face coordinate system that takes the facial feature point as a reference, wherein the makeup information includes a vector, in the face coordinate system, that takes as a start point a predetermined one of the facial feature point and the makeup feature point and takes as an end point the other of the facial feature point and the makeup feature point;
wherein the processor also
analyzes the makeup information acquired from a plurality of the makeup facial images, and determine a makeup trend; and
performs an information output process according to a determination result of the makeup trend.

9. A non-transitory computer-readable recording medium storing a makeup trend analyzing program instructing a processor to execute the makeup trend analyzing program to:
acquire a facial feature point within a makeup facial image that is an image of a face on which makeup is applied; and
acquire a makeup feature point within the makeup facial image;
wherein a makeup information generator generates, based on the facial feature point and the makeup feature point, makeup information quantitatively indicating positional information of the makeup feature point in a face coordinate system that takes the facial feature point as a reference, wherein the makeup information includes a vector, in the face coordinate system, that takes as a start point a predetermined one of the facial feature point and the makeup feature point and takes as an end point the other of the facial feature point and the makeup feature point;
wherein the program also instructs the processor to execute the makeup trend analyzing program to
analyze the makeup information acquired from a plurality of the makeup facial images, and determining a makeup trend; and
perform an information output process according to a determination result of the makeup trend.

* * * * *